ated Feb. 21, 1984

United States Patent [19]
Neely, Jr. et al.

[11] 4,433,016
[45] Feb. 21, 1984

[54] MULTIPLE GLAZED UNIT BONDED WITH FIBER-REINFORCED SILICATE CEMENT

[75] Inventor: James E. Neely Jr., Lower Burrell, Pa.

[73] Assignee: PPG Industries, Inc., Pittsburgh, Pa.

[21] Appl. No.: 388,330

[22] Filed: Jun. 14, 1982

Related U.S. Application Data

[63] Continuation-in-part of Ser. No. 286,993, Jul. 27, 1981, Pat. No. 4,334,941.

[51] Int. Cl.$^3$ .................... E06B 3/24; C09J 1/02; B32B 13/04
[52] U.S. Cl. .................... 428/34; 156/99; 156/107; 106/74; 106/84; 428/331; 428/401; 428/426; 428/428; 428/430; 428/435; 52/398; 52/399; 52/172; 52/788; 52/790
[58] Field of Search ............ 428/34, 428, 331, 401, 428/430, 435, 426, 192; 156/107, 99; 106/74, 84; 52/399, 788, 790, 172, 398

[56] References Cited

U.S. PATENT DOCUMENTS

| | | | |
|---|---|---|---|
| 2,662,022 | 12/1953 | Dietz | 106/74 |
| 3,178,299 | 4/1965 | Wilborn | 106/74 |
| 3,445,257 | 5/1969 | Hloch et al. | 106/84 |
| 3,454,410 | 7/1969 | Schutt | 106/74 |
| 3,919,023 | 11/1975 | Bowser | 428/34 |
| 3,930,876 | 1/1976 | Nakajima et al. | 106/74 |
| 3,943,231 | 3/1976 | Wasel-Nielsen | 106/74 |
| 3,996,409 | 12/1976 | Holloway | 428/432 |
| 4,149,348 | 4/1979 | Pyzewski | 428/34 |
| 4,173,668 | 11/1979 | Hentzelt | 428/34 |
| 4,205,104 | 5/1980 | Chenel | 428/34 |
| 4,216,190 | 8/1980 | Neeley, Jr. | 423/314 |
| 4,288,252 | 9/1981 | Neeley, Jr. | 106/74 |
| 4,319,926 | 3/1982 | Nowakowski | 106/84 |
| 4,334,941 | 6/1982 | Neely, Jr. | 156/107 |

Primary Examiner—Ellis P. Robinson
Attorney, Agent, or Firm—Donna L. Seidel

[57] ABSTRACT

A multiple glazed unit wherein glass sheets are bonded together and held in spaced relationship by means of a fiber-reinforced alkali silicate based cement composition is disclosed.

10 Claims, No Drawings

MULTIPLE GLAZED UNIT BONDED WITH FIBER-REINFORCED SILICATE CEMENT

CROSS REFERENCE TO RELATED APPLICATIONS

This application is a continuation-in-part of U.S. application Ser. No. 286,993 filed July 27, 1981, now U.S. Pat. No. 4,334,941, which in turn is a continuation-in-part of U.S. application Ser. No. 142,492 filed Apr. 21, 1980, now U.S. Pat. No. 4,288,252, which in turn is a continuation of U.S. application Ser. No. 973,479 filed December 26, 1978, now abandoned.

THE PRIOR ART

The present invention relates generally to the art of silicate compositions, and more particularly to the use of silicate cements to bond glass sheets in a multiple glazed window unit.

U.S. Pat. No. 3,445,257 to Hloch et al describes condensed aluminum phosphates used as hardeners for water glass cements. The condensed aluminum phosphates are prepared by subjecting aluminum orthophosphates to a stepwise thermal treatment. The cements are prepared from potash or soda water glasses by mixing 90 to 100 parts filler with 4 parts hardener, and then adding 25 to 30 parts of water glass. A typical cement has a pot life of 30 minutes, and then cures within 24 hours to form a mass which is resistant to acids and water.

U.S. Pat. No. 3,930,876 to Nakajima et al discloses an improved silica-phosphate type inorganic coating composition comprising a water-soluble silicate and an inorganic phosphate pretreated with such silicate. The pretreatment is accomplished by mixing the phosphate in powder form with an aqueous solution of the silicate in a mechanical mill. Filler and/or pigment in amounts of 60 percent by weight or less based on the weight of the pretreated phosphate may be added during or after the pretreatment of the phosphate. About 60 to 100 parts by weight of the pretreated phosphate and 100 parts by weight of silicate are then mixed together to form a uniform composition generally having a water content of ¼ to 2 parts by weight water per part of total solids.

U.S. Pat. No. 4,334,941 to Neely discloses bonding glass sheets together in a multiple glazed window unit with a composition comprising a mixture of alkali silicates, an aluminum trimetaphosphate hardener and optional filler material such as talc. While this composition cures to form an acceptable bond and spacer element, the long drying and curing cycles, typically requiring 2 to 3 days, are undesirable for large scale production.

SUMMARY OF THE INVENTION

The present invention provides a method for bonding glass plates in a multiple glazed unit utilizing silicate cements which can be set or dried in a relatively short time at relatively low temperatures with or without inorganic hardeners. The method of the present invention involves milling or blending a mixture of alkali silicate, reinforcing fibers, filler and optional desiccant. The water content of the mixture is adjusted to produce a cementitious material of suitable viscosity. The aqueous composition of the present invention is applied between two glass plates about their periphery, and dried at relatively low temperatures. The reinforcing fibers facilitate drying of the composition as well as provide impact strength to the cement. The dried silicate cement acts as spacer as well as bonding agent in the multiple glazed unit. An organic sealant is applied outside the cement to prevent moisture from entering the multiple glazed unit. In the event that no hardener is used to cure the cement to a water stable condition, the organic sealant also prevents moisture penetration from softening the cement.

DESCRIPTION OF THE PREFERRED EMBODIMENTS

Aqueous alkali metal or ammonium silicate compositions containing inorganic curing agents are preferably prepared according to the method disclosed in U.S. Pat. No. 4,288,252, the disclosure of which is incorporated herein by reference. A mixture of inorganic curing agent and filler is blended in any typical mechanical mixer, such as a planetary mixer. The inorganic curing agent may comprise any of the variety of phosphate, borate, aluminate or zincate curing agents which are useful for hardening silicate compositions, and preferably comprises the B-form of aluminum trimetaphosphate as disclosed in U.S. Pat. No. 4,216,190, which disclosure is incorporated herein by reference. A preferred method for making the B-form of aluminum trimetaphosphate is disclosed in U.S. Pat. No. 4,329,327, the disclosure of which is incorporated herein by reference. In alternative embodiments of the present invention, the silicate compositions may be prepared without an inorganic hardener.

Preferably, the hardener is mixed with a silicate composition which is a mixture of sodium silicate and potassium silicate. Preferred sodium silicates have mole ratios of $SiO_2/Na_2O$ between about 3.0 and 4.0 and are readily available as aqueous solutions from suppliers such as Diamond Shamrock Corporation of Cleveland, Ohio. Preferred potassium silicates have mole ratios of $SiO_2/K_2O$ between about 3.1 and 4.0 and are commercially available as aqueous solutions under the tradename KASIL from Philadelphia Quartz Corporation of Valley Forge, Pennsylvania. Potassium silicates may also be formulated in solid form by mixing silica and potassium carbonate in the desired ratio, melting and cooling to form a glass, and then sending the glass through hammer, roller, ball and/or vibratory mills to reduce the glass to a powder.

Cement compositions according to the present invention may be formulated by mixing sodium silicate solution with potassium silicate powder. While the mixed alkali silicate solution is being stirred, the inorganic phosphate hardener is added. The phosphate may be added as an aqueous slurry or it may be mixed with any dry filler powders such as talc that are being incorporated into the formulation. Preferably, mixing is carried out in a vacuum in order to remove entrained air. A preferred mixing procedure for cement compositions in accordance with the present invention involves blending all dry powder components, e.g. potassium silicate, B-form aluminum trimetaphosphate, and talc; hydrating a molecular sieve desiccant to prevent foaming; and blending the dry powder mixture, hydrated molecular sieve, aqueous sodium silicate solution and fiber-reinforcing material in a planetary mixer. The composition is continuously mixed, preferably under vacuum, until the viscosity increases to at least about 1,000,000 centipoises. The viscous cement is then loaded into plastic tubes which are used in conjunction with pneumatic guns for applying the cement between two sheets of glass.

The cement composition is preferably applied between two glass sheets in a horizontal orientation. The top glass sheet is spaced from the bottom sheet, and may be held in place either by mechanical spacers or suction cups. In one embodiment, styrofoam blocks approximately ½ inch (12.7 millimeters) square and having the thickness of the desired airspace in the multiple glazed window unit are placed at the four corners between the two glass sheets. In a preferred embodiment, the glass sheets are held apart by means of suction cups. The cement composition is then applied in a discontinuous bead, to allow for drying, which is recessed approximately ¼ inch (6.35 millimeters) between the two glass sheets about the perimeter. Following application of the cement, the units are transferred to a drying chamber. The presence of reinforcing fiber materials, preferably nylon or Dacron fibers, facilitates drying of the cement so that the composition may be dried more quickly. Drying of the cement also accomplishes regeneration of the hydrated desiccant to a dehydrated active state. Typically, the drying cycle involves about ten minutes at a temperature of about 90° C., followed by heating to 180° C. over a period of about two hours, a half hour hold at 180° C., and finally cooling to ambient temperature. The drying cycle generally requires only about 2½ to 3 hours, in contrast to several days as described in U.S. Pat. No. 4,334,941.

After the silicate composition has been dried, an organic sealant is applied about the periphery of the double glazed unit to provide a moisture barrier, particularly important if the silicate cement composition contains no inorganic hardener. Typical hot melt butyl sealants known in the multiple glazing art are generally satisfactory.

The present invention will be further understood from the descriptions of specific examples which follow.

EXAMPLE I

A cement composition is formulated by mixing together 55 grams of B-form aluminum trimetaphosphate, 165 grams of potassium silicate powder, 715 grams of talc and 24.2 grams of brown pigment. The aluminum trimetaphosphate is prepared by blending stoichiometric quantities of basic ammonium phosphate with aluminum hydroxide and heating to 600° C. for 2 hours. The potassium silicate powder is prepared by mixing silica and potassium carbonate in a weight ratio of 1.36:1. The mixture is melted, cast and cooled to form a glass which is then sent through mechanical mills to reduce the glass to a powder. The talc is available as MP 40-27 from Pfizer Minerals, Pigments and Metals Division, New York, New York. The brown pigment is a blend of 6.6 grams of #153, 11 grams of #20, and 6.6 grams of #19 Shepherd Chemical pigments. Hydrated desiccant is prepared by blending 473 grams of molecular sieve, Type 4A from Union Carbide, with 94.6 of water. The sodium silicate component is prepared by diluting 508.2 grams of Diamond Shamrock Grade 34 sodium silicate with 242 grams of water. The powder mixture, desiccant and 34.1 grams of ¼ inch Dacron organic fibers are added to the sodium silicate solution. The composition is blended for about 20 minutes in a planetary mixer, and subsequently applied by pneumatic gun between two glass sheets in the form of a bead which is recessed about ¼ inch (6.35 millimeters) from the edges of the sheets. The unit is subjected to a drying cycle wherein the temperature is held at 90° C. for about 10 minutes, raised to 180° C. over a period of 110 minutes, held at 180° C. for 30 minutes and finally allowed to return to ambient. The unit is then sealed with a hot melt butyl rubber sealant about the periphery, outside the cement bead.

EXAMPLE II

A cement composition is formulated by hydrating 645 grams of molecular sieve with 102 grams of water, and mixing together with 933 grams of Diamond Shamrock Grade 34 sodium silicate solution, 520 grams of KASIL 6 potassium silicate solution from Philadelphia Quartz Corporation, 963 grams of talc and 45.3 grams of ¼ inch (6.35 millimeters) Dacron organic fibers. The composition is mixed for 10 minutes under vacuum, applied between glass sheets, and subjected to the drying cycle described in Example I.

EXAMPLE III

A cement composition is formulated by mixing 933 grams of Diamond Shamrock Grade 34 sodium silicate solution and 520.8 grams of KASIL 6 potassium silicate solution from Philadelphia Quartz Corporation with 30 milliliters of water. To the mixed alkali silicate solution is added a slurry of 13.8 grams of B-form aluminum trimetaphosphate in 45 milliliters of water. Hydrated desiccant is prepared by mixing 723 grams of molecular sieve 4A with 134.4 milliliters of water. The hydrated desiccant, 1031.5 grams of talc, 45.8 grams of Dacron organic fibers, 18 grams of #20 and 12 grams of #19 Shepherd brown pigment are added to the composition, which is then mixed under vacuum for about 15 minutes. The cement composition is applied and dried as in the previous examples.

All of the above examples illustrate the production of multiple glazed units with fiber-reinforced, rapidly setting and drying mixed alkali silicate cement compositions. Various modifications such as different compositions, with or without inorganic hardeners, including other reinforcing fibers, and other drying cycles may be employed, and are included within the scope of the present invention, which is defined by the following claims.

I claim:

1. A method for bonding two sheets of glass in spaced relationship comprising the steps of:
   a. mixing sodium silicate, potassium silicate, filler and reinforcing fibers with water to form a cement composition;
   b. applying said cement composition between two glass sheets about the perimeter portion to be bonded;
   c. exposing said cement composition to sufficient temperature for sufficient time to dry the cement composition, thereby bonding said glass sheets in spaced relationship; and
   d. applying an organic sealant between the glass about the perimeter portion outside the cement.

2. The method according to claim 1, wherein the reinforcing fibers are selected from the group consisting of nylon and Dacron.

3. The method according to claim 1, wherein said filler is selected from the group consisting of talc, silica and mixtures thereof.

4. The method according to claim 1, wherein the cement composition further comprises a desiccant.

5. The method according to claim 4, wherein said desiccant is hydrated.

6. An article of manufacture which comprises:
   a. at least two glass sheets in spaced relationship;
   b. a cement composition consisting essentially of sodium silicate, potassium silicate, filler and reinforcing fibers; and
wherein said glass sheets are bonded together about the perimeter portion in spaced relationship by said cement composition and an organic sealant about the perimeter portion outside said cement.

7. An article according to claim 6, wherein said reinforcing fibers are selected from the group consisting of nylon and Dacron.

8. An article according to claim 7, wherein said fibers have an average length from about ¼ to ¾ inch (about 6.35 to 19.05 millimeters).

9. An article according to claim 6, wherein said filler is selected from the group consisting of talc, silica and mixtures thereof.

10. An article according to claim 6, wherein said cement composition further comprises a desiccant.